Aug. 22, 1950   F. G. SCHRADER   2,519,509
ADJUSTING MECHANISM FOR TESTING APPARATUS
Filed Oct. 31, 1944   2 Sheets-Sheet 1
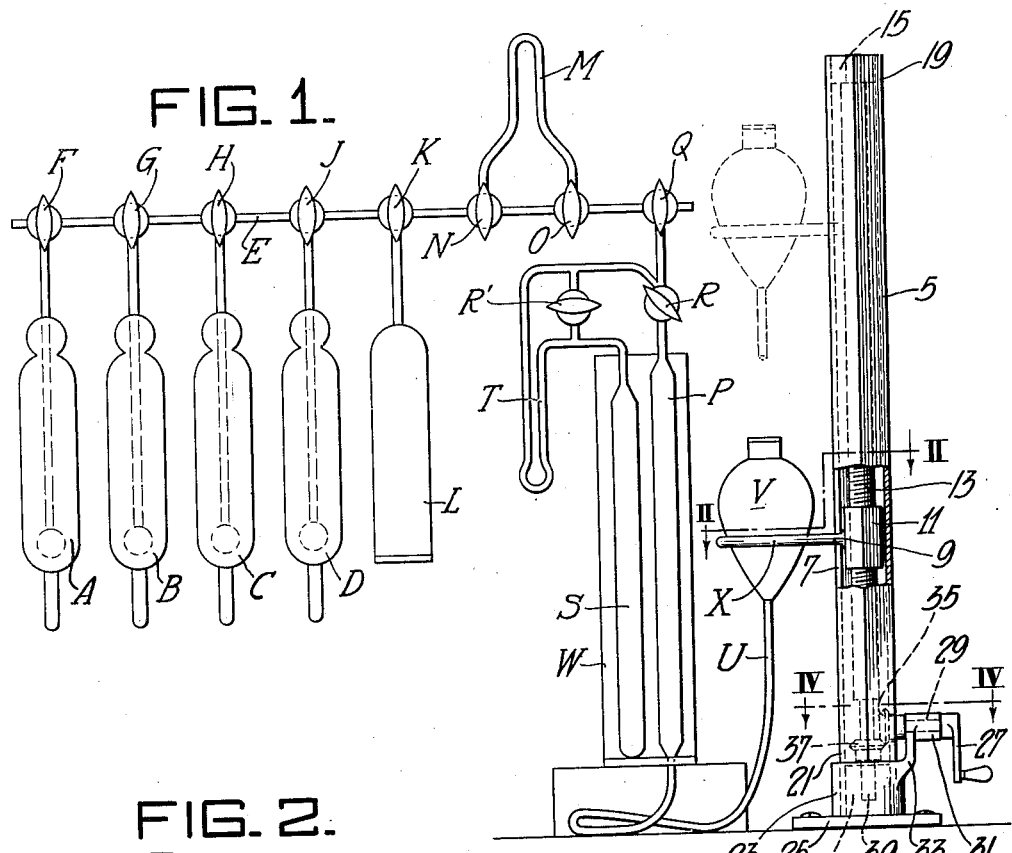
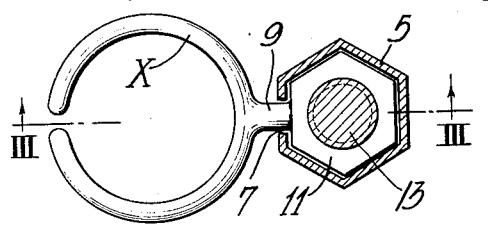
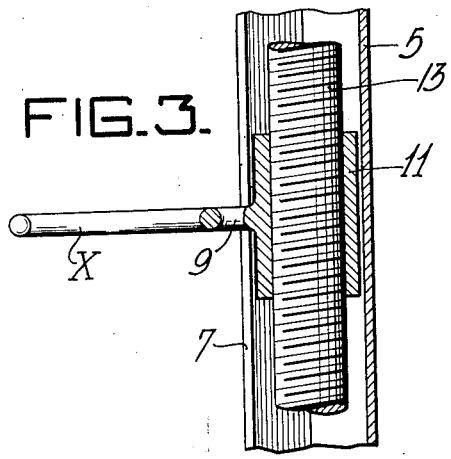
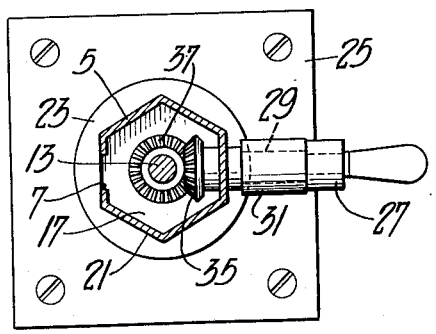
Inventor:
FRANK G. SCHRADER,
by: John E. Jackson
his Attorney.

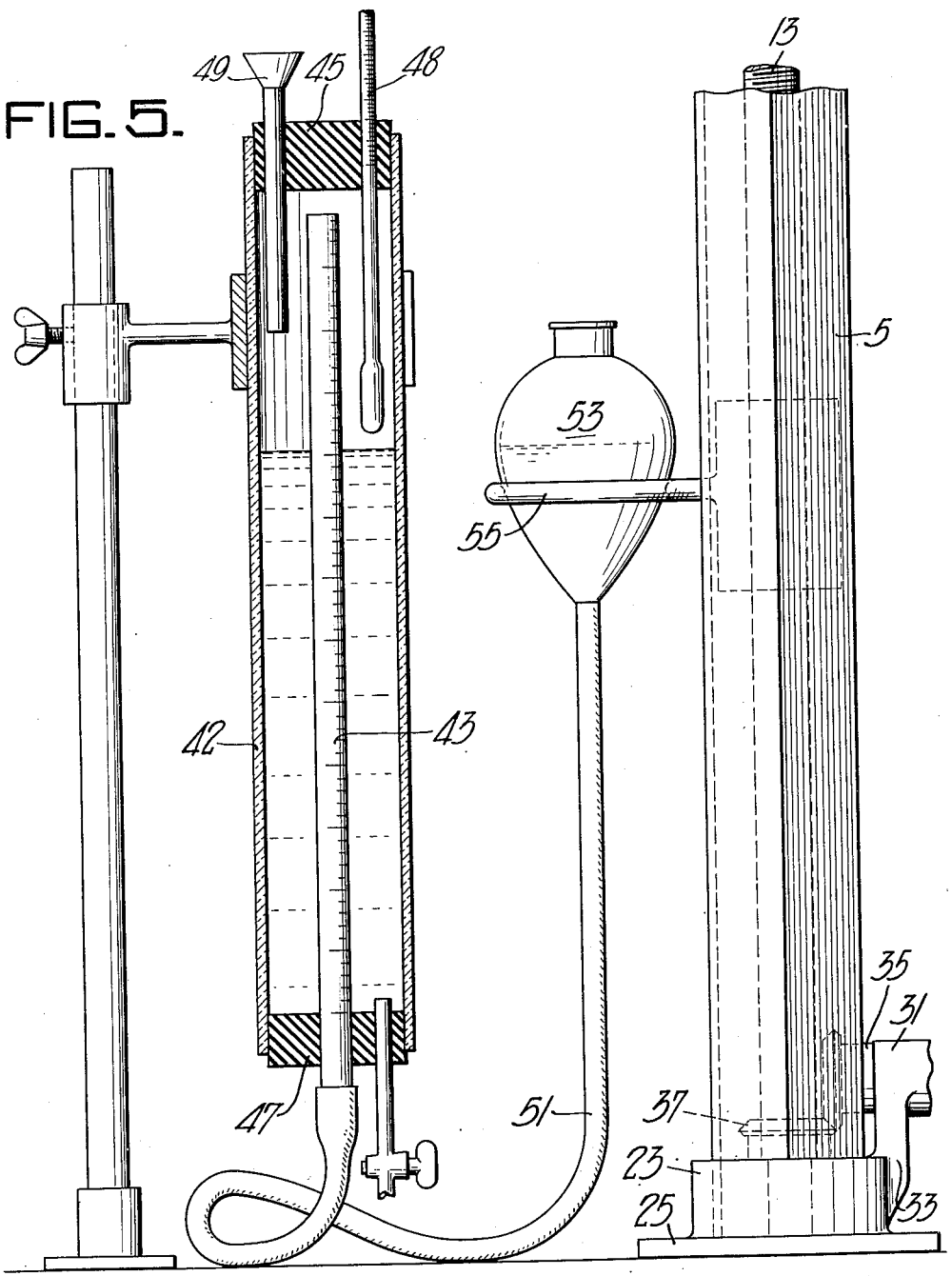

Patented Aug. 22, 1950

2,519,509

UNITED STATES PATENT OFFICE 2,519,509

ADJUSTING MECHANISM FOR TESTING APPARATUS

Frank G. Schrader, Hayward, Calif.

Application October 31, 1944, Serial No. 561,295

1 Claim. (Cl. 248—125)

The present invention relates to improvements in laboratory testing apparatus wherein a leveling bulb or bottle is employed for adjusting pressures in a gas-containing mercury tube. Such leveling bulbs or bottles are employed in many types of laboratory apparatus, such as, for example, in the well known Orsatt apparatus for gas analysis, apparatus for demonstrating gas laws, and many other types of apparatus wherein a volume of gas is confined in a graduated glass tube by a column of mercury or other suitable liquid, to which graduated glass tube the leveling bulb is connected by means of a flexible connecting tube, the mercury or other liquid filling the connecting tube and rising into the said tube and the leveling bulb and partially filling the same. In apparatus of this general type, mercury usually is the operating liquid owing to its high specific gravity and density.

In apparatus of such types, the leveling bulb is mounted in a ring of a ring stand, the ring being adjustably held on the vertical rod of the ring stand by means of a manually operated set screw. The manipulations of the leveling bulb are awkward, and exact adjustments of the bulb relative to the level of the mercury in the measuring tube are extremely difficult to obtain since the ring is prone to slip on the rod of the stand, or tilt slightly, and accurate fine adjustments of the ring along the rod are almost impossible.

The present invention provides means for mechanically effecting the adjustments of the leveling bulb in an easy and accurate manner, and so simply that a beginner can become adept at its manipulation almost immediately.

The invention will be understood more readily by reference to the accompanying drawings, in which:

Figure 1 is an elevation of a gas analysis apparatus embodying the improvements of the present invention, the illustrated apparatus being a modification of the well-known Orsatt type;

Figure 2 is a sectional plan taken on line II—II of Figure 1;

Figure 3 is a sectional elevation taken on line III—III of Figure 2;

Figure 4 is a sectional plan taken on line IV—IV of Figure 1; and

Figure 5 represents a diagrammatic view of a type of apparatus useful for demonstrating the gas laws.

Referring more particularly to the drawings and first to Figure 1, a standard type of gas analysis apparatus comprises four pipettes A, B, C, and D, containing solutions of various chemical reagents for absorption of the component gases in the sample of gas being tested. The pipettes are connected to the main line E of the manifold through stop-cocks F, G, H, and J. A slow combustion pipette L for determining methane and ethane is connected to the manifold through stopcock K. Mercury is generally used as the confining fluid in the slow combustion pipette, and is controlled by an auxiliary leveling bulb and rubber hose connection (not shown). A copper oxide tube M for the fractional combustion of carbon monoxide and hydrogen is connected to the manifold through stopcocks N and O.

A gas burette P is provided, and this burette is connected through the upper stopcock Q to the main line of the manifold. The burette P also is connected through stopcock R to a Patterson compensating tube S, a manometer T also being connected through stopcock R to the compensating tube S. The compensation stopcock R' is used to adjust the gas in the compensator tube S to atmospheric pressure by momentarily opening it at the beginning of an analysis.

The burette P is connected by a rubber tube U to a leveling bulb V, the rubber tube U extending through the bottom of a water jacket W. The leveling bulb V is mounted in a split ring X.

The present invention is concerned with a mechanism for operating the leveling bulb V. The drawings show one form of the apparatus or mechanism (Figures 1 through 4).

This apparatus includes a housing or guide tube 5, which, as shown, is hexagonal in cross section, although this is not necessary. However, it is convenient and desirable, as will be pointed out hereinafter. This housing is provided with a vertical slot 7 in which rides the arm on which ring X is mounted. The arm 9 is made integral with a hexagonal nut 11 threaded on a screw 13 journaled vertically of the housing 5, in thrust bearings 15 and 17, located at the upper end 19 and lower end 21 of the housing, respectively. The lower end of the housing is seated in a socket 23 extending upwardly from the base 25.

The rotation of the screw 13 is effected by a hand crank 27 secured to the end of the shaft 29, journaled in a bearing 31 carried by a bracket 33 on the base 23. The shaft 29 carries a bevel pinion 35, which meshes with a bevel gear 37 keyed to the lower end 39 of the screw 13, so that rotation of the crank 27 is transmitted to the screw 13.

When the crank 27 is turned clockwise, as shown, the pinion 35 turns clockwise, and bevel gear 37 turns counterclockwise, thereby causing the nut 11 and bracket 9 with its split ring X to ascend. Conversely, when the crank 27 is turned counterclockwise, the pinion 35 turns counterclockwise, thereby turning the screw clockwise and causing the nut 11 and bracket 9 with its split ring to descend.

The nut 11 is prevented from turning when the screw 13 is turned, by its hexagonal shape, and it is thus constrained by its snug fit within the hexagonal housing 5, the nut and housing together constituting, in effect, a slide bearing. The bracket 9 is flattened sufficiently for it to pass through the slot 7 in the housing, so that the split ring X is free to move up or down with the bracket 9 and nut 11, as crank 27 is turned.

The weight of the leveling bulb V, resting in the split ring X, and offset from the axis of the nut 11, creates a turning moment which binds the nut to the screw, so that the nut cannot overhaul the screw or move it under weight of the leveling bulb V. The threads on the screw 13, therefore, may have a larger pitch than would be possible if the coefficient of friction alone determined the pitch.

When the arrangement is used with a gas analysis apparatus, it should be arranged with the split ring X as close to the water jacket W as is practicable. The base 25 of the housing 5 can be fastened by screws to a table or other surface.

Referring to Figure 5, the invention is shown as applied to a leveling bulb of a laboratory apparatus for demonstrating the gas laws. The apparatus includes a water jacket composed of a glass cylinder 42 open at both ends, and receiving a gas measuring tube 43, graduated in cubic centimeters. The ends of the water jacket are closed by suitable two-hole rubber stoppers indicated at 45 and 47, the upper stopper 45 receiving a thermometer 48 for indicating various temperatures of water introduced into the jacket through a funnel 49 extending through the other hole in stopper 45.

The bottom stopper 47 has the tube 43 extending through one hole, with the open end of the tube 43 extending below the stopper for the attachment of the rubber tube 51 to the other end of which tube is attached a leveling bulb 53 received in a split ring 55 of the lifting mechanism of the present invention, the parts of which are indicated as shown in Figures 1, 2, 3, and 4. Mercury is poured into the leveling bulb until it rises to a desired height in the tube 43. The height of the mercury in the tube 43 is adjusted as desired by raising and lowering the bulb as described above.

The details of the operation of the system of Figures 1 and 5 need not be described in detail, such operation being apparent to one skilled in the art and the systems themselves being shown only for the purpose of illustrating the general types of apparatus that may be employed in connection with the present invention, and to make more apparent the advantages and operation thereof for lifting and lowering, accurately and precisely, the bulb for effecting desired adjustments of the mercury level in the mercury tubes.

I claim:

A laboratory ring stand comprising a base, a guide tube disposed vertically thereon having a longitudinal slot in one side, a screw journaled coaxially in said tube, a nut on said screw, an arm projecting laterally from said nut through said slot, a ring carried by said arm, a bracket on said base, a drive shaft journaled horizontally therein, a bevel gear on said screw at the lower end thereof and a bevel pinion on said shaft meshing with said gear, whereby rotation of said shaft effects a precision adjustment of said ring vertically.

FRANK G. SCHRADER.

REFERENCES CITED

The following references are of record in the file of this patent:

UNITED STATES PATENTS

| Number | Name | Date |
|---|---|---|
| 845,739 | Alson | Mar. 5, 1907 |
| 1,526,151 | Kinney | Feb. 10, 1925 |
| 2,091,858 | Johnson | Aug. 31, 1934 |
| 2,043,140 | Wilmesheer | June 2, 1936 |
| 2,202,265 | Phillips | May 28, 1940 |
| 2,252,146 | Walsh | Aug. 12, 1941 |
| 2,291,999 | Wilson et al. | Aug. 4, 1942 |
| 2,323,556 | Mattocks | July 6, 1943 |

FOREIGN PATENTS

| Number | Country | Date |
|---|---|---|
| 435,547 | Germany | Oct. 13, 1926 |